US010665233B2

(12) United States Patent
Retter et al.

(10) Patent No.: US 10,665,233 B2
(45) Date of Patent: May 26, 2020

(54) METHOD FOR OPERATING A SERVER SYSTEM AND FOR OPERATING A RECORDING DEVICE FOR RECORDING A VOICE COMMAND; SERVER SYSTEM; RECORDING DEVICE; AND SPOKEN DIALOGUE SYSTEM

(71) Applicant: Robert Bosch GmbH, Stuttgart (DE)

(72) Inventors: Ralph Retter, Stuttgart (DE); Tobias Scheideck, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 15/772,853

(22) PCT Filed: Oct. 28, 2016

(86) PCT No.: PCT/EP2016/076012
§ 371 (c)(1),
(2) Date: May 2, 2018

(87) PCT Pub. No.: WO2017/084860
PCT Pub. Date: May 26, 2017

(65) Prior Publication Data
US 2018/0322868 A1 Nov. 8, 2018

(30) Foreign Application Priority Data
Nov. 20, 2015 (DE) .......... 10 2015 222 956

(51) Int. Cl.
*G10L 15/22* (2006.01)
*H04L 29/08* (2006.01)
(Continued)

(52) U.S. Cl.
CPC .............. *G10L 15/22* (2013.01); *G10L 15/30* (2013.01); *H04L 67/141* (2013.01);
(Continued)

(58) Field of Classification Search
CPC ....................................................... G10L 15/22
(Continued)

(56) References Cited

U.S. PATENT DOCUMENTS 8,400,162 B1* 3/2013 Jannson ............... G01R 31/367
324/427
9,706,449 B2* 7/2017 Speks ................. H04L 65/1016
(Continued)

FOREIGN PATENT DOCUMENTS

EP 1104155 A2 5/2001

OTHER PUBLICATIONS

International Search Report dated Jan. 23, 2017 of the corresponding International Application PTC/EP2016/076012 filed Oct. 28, 2016.

Primary Examiner — Susan I McFadden
(74) Attorney, Agent, or Firm — Norton Rose Fulbright US LLP; Gerard Messina (57) ABSTRACT

A method for operating a server system that includes a plurality of servers for processing a voice command recorded by a recording device connected, via an interface, to the server system includes, in response to the recording of the voice command, reading in a session activation signal from the recording device; checking if there is an association between the session activation signal and a session ID; if it is established that there is the association between the session activation signal and the session ID, ascertaining an availability of a prior server that previously processed a session assigned to the session ID; and activating the session on the prior server if it is available, but, if it is not available, then activating the session on a free server of the server system by loading the session from a session database. The voice command is received by the corresponding server (Continued)

during the activation of the session or even subsequent to the activation of the session, in order to be processed.

9 Claims, 3 Drawing Sheets

(51) Int. Cl.
     *G10L 15/30*      (2013.01)
     *H04W 4/10*      (2009.01)

(52) U.S. Cl.
     CPC ............. *H04L 67/146* (2013.01); *H04W 4/10* (2013.01); *G10L 2015/223* (2013.01)

(58) Field of Classification Search
     USPC ........................................................ 704/275
     See application file for complete search history.

(56) References Cited

U.S. PATENT DOCUMENTS

| | | |
|---|---|---|
| 2005/0021771 A1 | 1/2005 | Kaehn et al. |
| 2007/0124149 A1 | 5/2007 | Shen et al. |
| 2011/0054894 A1 | 3/2011 | Phillips et al. |

\* cited by examiner

METHOD FOR OPERATING A SERVER SYSTEM AND FOR OPERATING A RECORDING DEVICE FOR RECORDING A VOICE COMMAND; SERVER SYSTEM; RECORDING DEVICE; AND SPOKEN DIALOGUE SYSTEM

CROSS-REFERENCE TO RELATED APPLICATIONS

The present application is the national stage of International Pat. App. No. PCT/EP2016/076012 filed Oct. 28, 2016, and claims priority under 35 U.S.C. § 119 to DE 10 2015 222 956.4, filed in the Federal Republic of Germany on Nov. 20, 2015, the content of each of which are incorporated herein by reference in their entireties.

FIELD OF THE INVENTION

The present invention relates to systems, devices, and methods for processing voice commands with a server system.

BACKGROUND

U.S. Pat. App. Pub. No. 2007/0124149 A1 describes a voice-controlled logic operations module for processing and executing at least one voice-controlled function of an electronic device, which includes a voice-controlled database for storing the function.

SUMMARY

Example embodiments of the present invention are directed to a method for operating a server system having at least one server for processing a voice command, a method for operating a recording device for recording a voice command, a server system, a recording device, a voice dialogue system, and corresponding computer programs.

According to an example embodiment, a method for operating a server system having at least one server for processing a voice command, which is recorded by a recording device connected to the server system via an interface, includes: during or prior to the recording of the voice command, reading in a session activation signal, which represents a signal provided by the recording device via the interface; checking if there is an association between the session activation signal and a session ID; ascertaining an availability of a prior server, which previously processed a session assigned to the session ID upon the reading-in of the session activation signal if, in the checking step, it is established that there is the association between the session activation signal and the session ID; activating the session on the prior server if, in the ascertaining step, it is established that the prior server is available, and/or activating the session on a free server by loading data assigned to the session from a session database if, in the ascertaining step, it is established that the prior server is not available; and receiving the voice command via the interface during the activation of the session and/or subsequent to the activation of the session.

For example, a cloud-based server system can be understood as a server system. A recorded acoustic command in the form of a spoken word, a spoken sentence, or a sequence of a plurality of such words or sentences can be understood as a voice command. The interface can be, in particular, an interface for wireless transmission of data between the server system and the recording device. A voice-controlled device, such as a navigation device or infotainment system, a hands-free telephone, or another control device for controlling functions of a vehicle, can be understood as a recording device. The server system and the recording device can form a client-server system in the form of a spoken dialogue system, the recording device acting as a client.

The session activation signal can be provided, for example, at the beginning or shortly after the beginning of a recording of the voice command, more or less in response to the manipulation of a corresponding switch of the recording device, or upon the speaking of a particular keyword for activating a recording function of the recording device.

An identifier for uniquely identifying the session can be understood as a session ID. The session ID can be used for recognizing a plurality of related queries of the recording device and assigning them to a session. A fixed connection between the recording device and the server can be understood as a session. For example, the session ID can be generated by the server at the beginning of the session and transmitted with a response of the server to the recording device. In this connection, the recording device can supply the session ID with each further instance of access to the server. With the aid of the session ID, data stored on the side of the server can be associated uniquely with the recording device with each instance of access. For example, a query of the recording device, which does not contain a session ID, can be evaluated as a first query of a new session. During a current session or at the end of a session, data concerning the session can be saved in the session database by the server processing the session. These data can be loaded from the session database onto a further server, if the session is continued on the further server at a later time.

An available, that is, operational server of the server system, differing from the prior server, can be understood as a free server. In the ascertaining step, the free server can be ascertained, if the prior server is not available.

A storage device, in which session data of different deactivated sessions for processing voice commands are stored, may be understood as a session database. Accordingly, in the activating step, such a deactivated session can be reactivated by the free server by loading the corresponding session data. For example, the session database can be called up by any server of the server system.

Depending on the specific embodiment, the voice command can be received when the activation of the corresponding session is still in progress or already finished. In the first case, the voice command can be stored temporarily until the session is loaded completely; in the second case, the voice command can be processed further in the session, immediately after being received.

The approach described here is based on the knowledge that by early activation of a session for the processing of a voice command on the side of the server, latency times during the processing of the voice command can be eliminated or at least markedly reduced. Such a session can advantageously be activated during a time span, in which the voice command is recorded by a corresponding recording device. Consequently, the session can be activated before the voice command is transmitted to the voice recognition server, which means that the voice command can be evaluated in the session, immediately following the transmission.

Such efficient session management is suited, in particular, for spoken dialogue systems in a cloud, which are capable of being scaled up. For example, server dialogue managers for speech in a distributed client-server system having a very high number of clients can be scaled efficiently without long latency times occurring in the process. Thus, an overall system made up of an embedded system or embedded device and a server back end for long-running spoken dialogues can be improved in such a manner, that as few servers as possible are required for as many clients as possible. Depending on the specific embodiment, the individual clients can be assigned new servers dynamically as required, which, for example, are provided in the cloud on demand. In addition, it is possible to set up complex session states in very long-running, spoken dialogues, without, in this case, long latency times resulting for the user.

Since, in back-end spoken dialogue systems having very many clients and long-running dialogues, a capability to horizontally scale the spoken dialogue system in connection with an embedded client can be attained, without observable latency times occurring for the user of the spoken dialogue system upon the reactivation of inactive sessions, the following advantages result.

Such a spoken dialogue system can serve very many clients, using comparatively few server resources, as sessions on the specific server can already be switched to be inactive in response to short periods of inactivity on the side of the user, and the server resources that have become free can again be assigned to other clients. Therefore, the economic efficiency of the overall system can be increased.

That is, queries can be distributed flexibly to the available computing capacity, as the queries of a client are directed to different servers of the server system as a function of availability and capacity utilization. This also allows cloud resources to be switched on and off dynamically, and consequently, pay-per-use payment models to be used for server resources.

As already mentioned, a considerable advantage of the approach described here is that in light of the response latency times, the user does not perceive a difference between a server session presently active during a query and a server session not active during a query.

This is accomplished by utilizing the characteristics of the overall system specific to spoken dialogue. For example, to record a voice command, a so-called push-to-talk button can be pressed or a so-called hot word can also be spoken, in order to signal the beginning of a voice input to the client device in the form of the recording device. For example, the user can ask to speak using an acoustic signal and, depending on the system configuration, by voice prompt as well, whereupon the user says the voice command, and a corresponding audio stream is transmitted to the dialogue system. The time span between pressing the push-to-talk button or recognizing the hot word and the end of saying the voice command can now be used, in order to reactivate a session status. Consequently, latency times, which extend beyond a normal latency of the voice-controlled system, are prevented.

Depending on the specific embodiment, the approach described here can also be used in the context of systems, in which voice commands are not transmitted all at once, but as a stream. In this connection, e.g., the session activation signal for activating a session can already be transmitted at the beginning of the stream.

According to an example embodiment, the method includes a step of processing the voice command. In this case, the voice command can be processed in the session, using the prior server, if the session was activated on the prior server. Additionally or alternatively, the voice command can be processed, using the free server, if the session was activated on the free server. Since the voice command can be processed as a function of the availability of different servers of the server system, the efficiency of the server system can be improved.

It is also advantageous, if the voice command is stored temporarily in a temporary storing step, if the session is not yet activated upon the receiving of the voice command. In this manner, the voice command can be processed immediately subsequent to the activation of the session, thereby allowing a latency time between reception and processing of the voice command to be reduced.

According to an example embodiment, in the ascertaining step, the free server is ascertained if, in the checking step, it is established that there is no association between the session activation signal and the session ID. In this context, in a generating step, a new session ID can be generated by the free server; in the activating step, a new session assigned to the new session ID can be activated on the free server; and in the receiving step, the voice command can be received during the activation of the new session and/or subsequent to the activation of the new session. This also allows server resources of the server system to be distributed rapidly and efficiently upon the starting of new sessions.

In the ascertaining step, it is advantageous for the free server to be ascertained, if, in the ascertaining step, it is established that the prior server is not available. In this manner, the session can even be carried out if the prior server is not available.

In addition, in the reading-in step, at least one further session activation signal can also be read in, which represents a signal supplied by a further recording device connected to the server system via the interface in response to the recording of a further voice command. Accordingly, in the checking step, it can be checked if there is an association between the further session activation signal and a further session ID. In the ascertaining step, an availability of a further prior server can be ascertained, which previously processed a further session assigned to the further session ID upon the reading-in of the further session activation signal if, in the checking step, it is established that there is the association between the further session activation signal and the further session ID. In the activating step, the further session can be activated on the further prior server, if, in the ascertaining step, it is established that the further prior server is available. Additionally or alternatively, in the activating step, the further session can be activated on the free server or a further free server or on both the free server and the further free server, by loading data assigned to the further session from the session database, if, in the ascertaining step, it is established that the further prior server is not available. Finally, in the receiving step, the further voice command can be received during the activation of the further session and, additionally or alternatively, subsequent to the activation of the further session. The recording device and the recording device can be installed, for example, in different vehicles and connected to the server system via a suitable wireless communication connection. In this manner, voice commands of a plurality of recording devices can be processed by one and the same server system, which means that the recording devices can be manufactured in a less complex manner, and therefore, less expensively.

The approach proposed here further provides a method for operating a recording device for recording a voice command, the recording device being connected via an interface to a server system having at least one server for processing the voice command, the method including the step of supplying a session activation signal to the interface when the voice command is recorded, in order to activate a session for processing the voice command on the server. This method can be implemented, for example, as software or hardware, or in a combined form of software and hardware, in, for example, a control unit.

Furthermore, the approach described here provides a server system that includes at least one server for processing a voice command, which represents a voice command recorded by a recording device connected to the server system via an interface; a reading-in unit for reading in a session activation signal, which represents a session activation signal provided by the recording device via the interface, in response to the recording of the voice command; a checking unit for checking if there is an association between the session activation signal and a session ID; an ascertaining unit for ascertaining an availability of a prior server, which previously processed a session assigned to the session ID upon the reading-in of the session activation signal, if there is the association between the session activation signal and the session ID; a session database; an activation unit for activating the session on the prior server if the prior server is available, and/or for activating the session on a free server by loading data assigned to the session, from the session database, if the prior server is not available; and a receiving unit for receiving the voice command during the activation of the session and/or subsequent to the activation of the session.

For example, the reading-in, checking, and ascertaining unit(s) can be implemented as a component of a load distribution unit of the server system, also called a load balancer. However, the receiving unit or the activation unit can be implemented, for example, as a component of a session administration unit or session manager assigned to an individual server. Alternatively, the receiving unit or the activation unit can also be integrated into the load distribution unit. For example, the session database can be configured to communicate with the specific session administration units of different servers of the server system.

Such a server system allows rapid, as well as cost- and resource-saving processing of voice commands.

The approach proposed here further provides a recording device for recording a voice command, the recording device including an interface to a server system that includes at least one server for processing the voice command; and a provision unit, which, in response to the recording of the voice command, is configured to provide, to the interface, a session activation signal for activating a session on the server for processing the voice command.

Since the voice command is not processed by the recording device itself, but with the aid of an external server system, the manufacturing of the recording device can be simplified. In this manner, the implementation of new voice commands can also be facilitated.

Finally, the approach described here provides a spoken dialogue system including: a server system according to a preceding example embodiment; and at least one recording device connected to the server system via an interface, according to any of the example embodiments described above.

The spoken dialogue system can be a cloud-based system, in which individual servers can be added or removed rapidly and simply, according to demand, in order to process voice commands. In this manner, the spoken dialogue system can be operated in a particularly efficient and cost-saving manner. For example, the spoken dialogue system can assign the steps necessary for processing voice commands to a plurality of components. These components can be distributed among different servers.

Example embodiments are also directed to a computer program product or computer program, including program code, which can be stored on a machine-readable carrier or storage medium, such as a solid state memory, a hard disk storage device or an optical storage device, and is used for performing, implementing, and/or controlling the steps of the method according to one of the above-described example embodiments, in particular, when the program product or program is executed on a computer or a device.

Exemplary embodiments of the present invention are represented in the drawings and explained in greater detail in the following description.

DETAILED DESCRIPTION

In the following description of preferred exemplary embodiments of the present invention, the same or similar reference numerals are used for the elements that are shown in the different figures and function similarly, in which case a repeated description of these elements is omitted.

Figure 1:
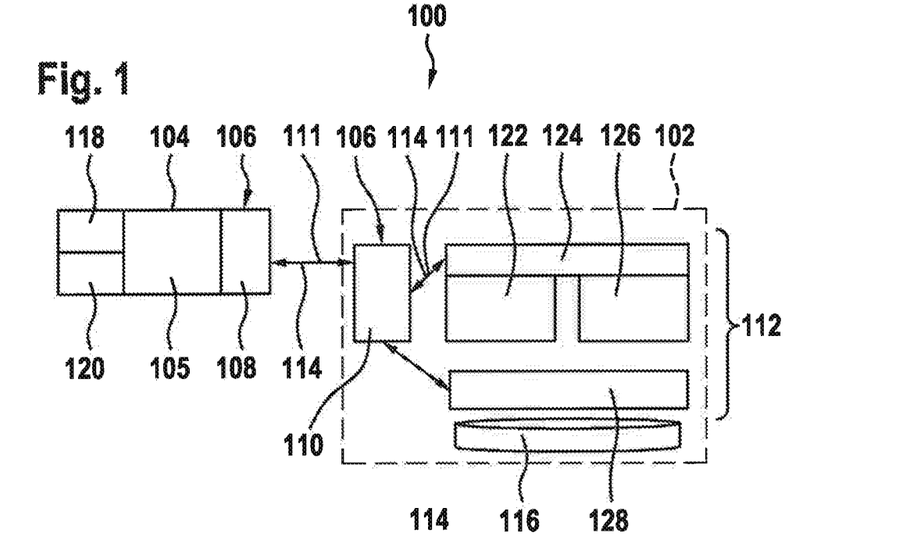
FIG. 1 is a schematic representation of a spoken dialogue system according to an example embodiment of the present invention.

FIG. 1 shows a schematic representation of a spoken dialogue system 100 according to an example embodiment. Spoken dialogue system 100 includes a server system 102, as well as a recording device 104 having a provision unit 105. Recording device 104 is connected to server system 102 via an interface 106. According to this example embodiment, interface 106 includes a connectivity module 108 of recording device 104, as well as a load distribution unit 110 or load balancer of server system 102. Connectivity module 108 and load distribution unit 110 are configured, for example, to communicate with each other via a wireless data connection. Recording device 104 is configured to record a voice command 111 spoken by a user of recording device 104, and to transmit it to server system 102 via interface 106. Server system 102 is implemented, for example, by a server 112, which is connected to load distribution unit 110 and configured to process the voice command 111 read in via load distribution unit 110. Depending on the exemplary embodiment, server system 102 can also be implemented by two or more than two such servers. For example, spoken dialogue system 100 is, in an example, cloud-based.

Provision unit 105 is configured to provide a session activation signal 114 in response to the recording of voice command 111 and to transmit it to connectivity module 108. Connectivity module 108 transmits session activation signal 114 to load distribution unit 110. Load distribution unit 110 then checks if there is an association between session activation signal 114 and a session ID, that is, if session activation signal 114 is assigned to an already existing session for processing voice command 111, using a server of server system 102. If this is the case, then load distribution unit 110 ascertains the server, which last processed the session that is assigned to session activation signal 114 and corresponds to the session ID, and ascertains if this server is available at the time that session activation signal 114 is received.

For example, the load distribution unit 110 in FIG. 1 ascertains that server 112 processed the session last and is available at the same time, that is, that the session on server 112 is still active. Accordingly, load distribution unit 110 transmits voice command 111 to server 112, in order that it can process voice command 111 in the session still active.

However, if load distribution unit 110 ascertains that server 112 is not available and another server of server system 102 is available, then load distribution unit 110 accordingly activates the session on the other server. To this end, the other server loads session data regarding the session, from a session database 116 of server system 102.

After activation of the session, the other server receives voice command 111 from load distribution unit 110, in order to process it in the activated session. Alternatively, the other server already receives voice command 111 during the activation of the session. Since, with the aid of session activation signal 114, the session is already activated at the beginning of a recording of voice command 111, time delays in the subsequent processing of voice command 111 can be prevented, that is, the session is already activated completely when voice command 111 is received by the other server.

For example, embedded devices for infotainment systems in motor vehicles can be controlled with the aid of a local dialogue manager, which is available to this very device and mainly serves exactly one user. However, after delivery of the embedded system, for instance, of the vehicle, such a local dialogue manager, is, as a rule, difficult to adapt and can only be operated, using the limited resources of the computer components installed in the embedded system. In order to prevent this, the entire dialogue manager, or at least parts of it, can be relocated to a back end of a server. The advantage of this is that the dialog manager can be adapted and updated centrally for all of the clients, in the back end of the server.

In order to scale such a server system to a large number of clients in the form of different recording devices, queries of these clients can be distributed by one or more load distribution units to a plurality of entities of the server system. This allows a so-called horizontal scalability to be achieved, in which the number of clients can be increased by adding further servers in the back end. Depending on the application case, an individual server of the server system can, for example, serve a plurality of clients simultaneously. Since not all of the clients are always active at the same time, it is possible to keep the number of required servers as low as possible, so that as many client sessions as possible are distributed to as few servers as possible.

In the case of long-running transactions, for instance, in spoken dialogues, sessions of clients, which are not active at the moment, are normally retained in a persistent storage medium, in order that the required computing resources can be assigned to active clients. Upon reactivation of a client, the session can be reactivated from the persistent storage device, on the corresponding server. The server can now continue the long-running dialogue at the point, at which the client was prior to its inactive phase. However, in very large sessions, for instance, for complex spoken dialogues and context models, the reactivation of the corresponding dialogue sessions can possibly take such a long time, that observable latency times occur.

The number of servers in the back end can be statically adjusted with regard to how many clients are simultaneously active in the extreme case and how much computing power corresponding to the number of simultaneously active clients is needed in the extreme case.

Alternatively, so-called cloud platforms can be used, which allow new servers to be provided within seconds or minutes. In this manner, back ends can grow or shrink dynamically as a function of the active clients, that is, servers can be added to the cloud or removed from the cloud dynamically.

In order to prevent or shorten these latency times, the recording device 104 to be used for speech includes, for example, a connectivity module 108, which is configured to set up a connection between provision unit 105 and a web-based server system 102 via WLAN, GSM, LTE, Ethernet or Bluetooth. Connectivity module 108 optionally includes a security module for authenticating, authorizing and encrypting the transmission of data between provision unit 105 and server system 102.

In addition, a voice-controlled system made up of a microphone 118 for picking up voice command 111 and a voice output unit 120 for reproducing acoustic signals, such as voice messages, is integrated into recording device 104.

On the side of the server, spoken dialogue system 100 includes load distribution unit 110, as well as a cloud-based server system 102 having a voice-recognition unit 122, a dialog manager 124, an optional text-to-speech engine 126, a session manager 128, and session database 116. Alternatively, parts of the spoken dialogue system, in particular, voice recognition unit 122 and text-to-speech engine 126, can also reside on one or more further servers and be connected to server 112 via network communication.

According to the exemplary embodiment shown in FIG. 1, dialog manager 124, voice recognition unit 122, text-to-speech engine 126, and session manager 128 are implemented as components of server 112.

A method of functioning of spoken dialogue system 100 is described in the following. When a user of recording device 104 activates a recording switch of recording device 104, also known as a push-to-talk button, or says a keyword or hot word for starting a recording over the voice-controlled system of recording device 104, recording device 104 transmits a session activation command in the form of session activation signal 114 via connectivity module 108 to cloud-based server system 102. Session activation signal 114 is received by load distribution unit 110.

In the processing of session activation signal 114, one can distinguish between three cases. In the first case, there is no association between session activation signal 114 and a session ID. In this case, load distribution unit 110 uses a standard algorithm, such as round robin, in order to transmit queries not having a session ID, i.e., new sessions, to session manager 128 of server 112. In addition to server 112, server system 102 can include a plurality of further servers. As a function of availability, the queries are also able to be transmitted to one of the plurality of further servers, instead of to server 112. Immediately after that, session manager 128 generates a new session ID and activates dialogue manager 124. Dialogue manager 124 is configured to administer the user dialogue, using voice recognition unit 122, text-to-speech engine 126, as well as application functionalities and possibly external services, and is configured to interact with the user via connectivity module 108, the voice-controlled system or other interfaces of recording device 104.

In the second case, a session already exists. If a message to a server contains a session ID, then load distribution unit 110 attempts to transmit the query to the server, which has processed the session up to now. If it is not available or is utilized to capacity, then load distribution unit 110 transmits the session to another available server, as described in the following. If the server in question is available, for example, the server 112 in FIG. 1, then session manager 128 checks if the session corresponding to the session ID is still active on server 112. If yes, then session manager 128 simply continues to use the session. If no, then the corresponding session is reactivated, as described below.

In the third case, a session already exists, but the session is deactivated. For example, the session is not active for the following reasons. The session was allowed to persist, in order to free computing capacity or memory for other clients, which means that the server did indeed process the session beforehand, but it is no longer in the active memory of the server. A further reason can be that the server, which processed the session before, is meanwhile no longer available, for instance, because it is overloaded or it has stopped functioning or is being updated at the moment, so the session must now be processed by another server.

If a session initiation command in the form of session activation signal 114 now reaches such a free server, then this uses its session manager, in order to load the session from the jointly used session database 116, and informs load distribution unit 110 that it is processing the session. If voice command 111 is now sent by recording device 114 to the free server, then the session is already activated, which means that voice command 111 may be processed immediately.

If the loading of sessions takes a very long time, then the free server can store subsequent queries temporarily in a queue and process them immediately after successful activation of the session. In this case, the latency can be reduced by at least the time of saying voice command 111 or of transmitting a first part of a stream.

Figure 2:
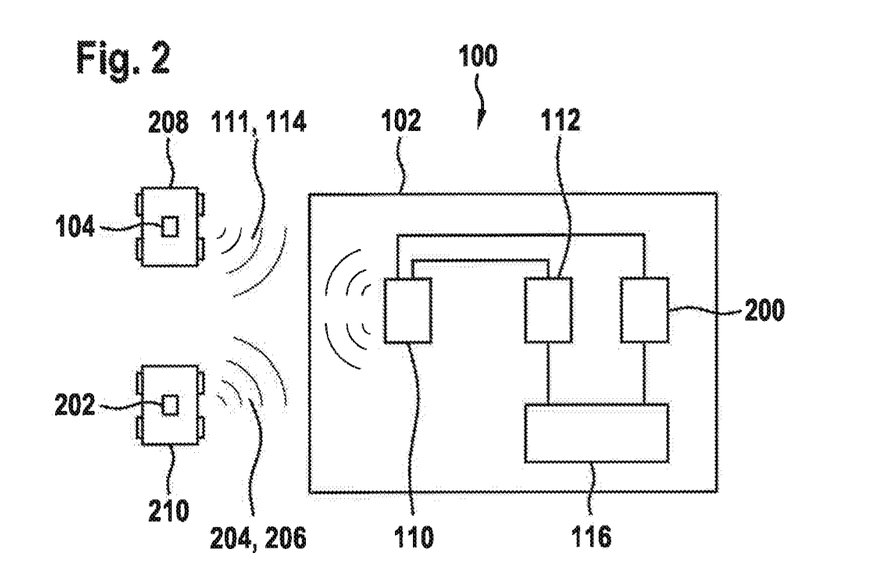
FIG. 2 is a schematic representation of a spoken dialogue system according to according to an example embodiment of the present invention.

FIG. 2 shows a schematic representation of a spoken dialogue system 100 according to an example embodiment. Spoken dialogue system 100 is, for example, a spoken dialogue system as described above in light of FIG. 1. The server system 102 including load distribution unit 110 and server 112 are shown. In contrast to FIG. 1, server system 102 according to this exemplary embodiment is implemented to include a further server 200 for processing voice commands. Further server 200 is connected to both load distribution unit 110 and session database 116, as is server 112. In addition to recording device 104, spoken dialogue system 100 also includes a further recording device 202, which, in response to the recording of a further voice command 204, is configured to provide a further session activation signal 206 and to transmit it to load distribution unit 110. Accordingly, load distribution unit 110 is configured to check if there is an association between further session activation signal 206 and a further session ID, and in the case of an association, to ascertain if a server, which previously processed a further session assigned to the further session ID, is available. The available server is, for example, further server 200. The further session is now activated on further server 200, in that further server 200 loads the further session from session database 116. In a manner analogous to the processing of voice command 111, further voice command 204 is already received from further server 200 during the activation of the further session or also immediately subsequent to the activation of the further session as well, depending on the exemplary embodiment.

As can be seen in FIG. 2, recording device 104 is installed in a first vehicle 208, and further recording device 202 is installed in a second vehicle 210.

Figure 3:
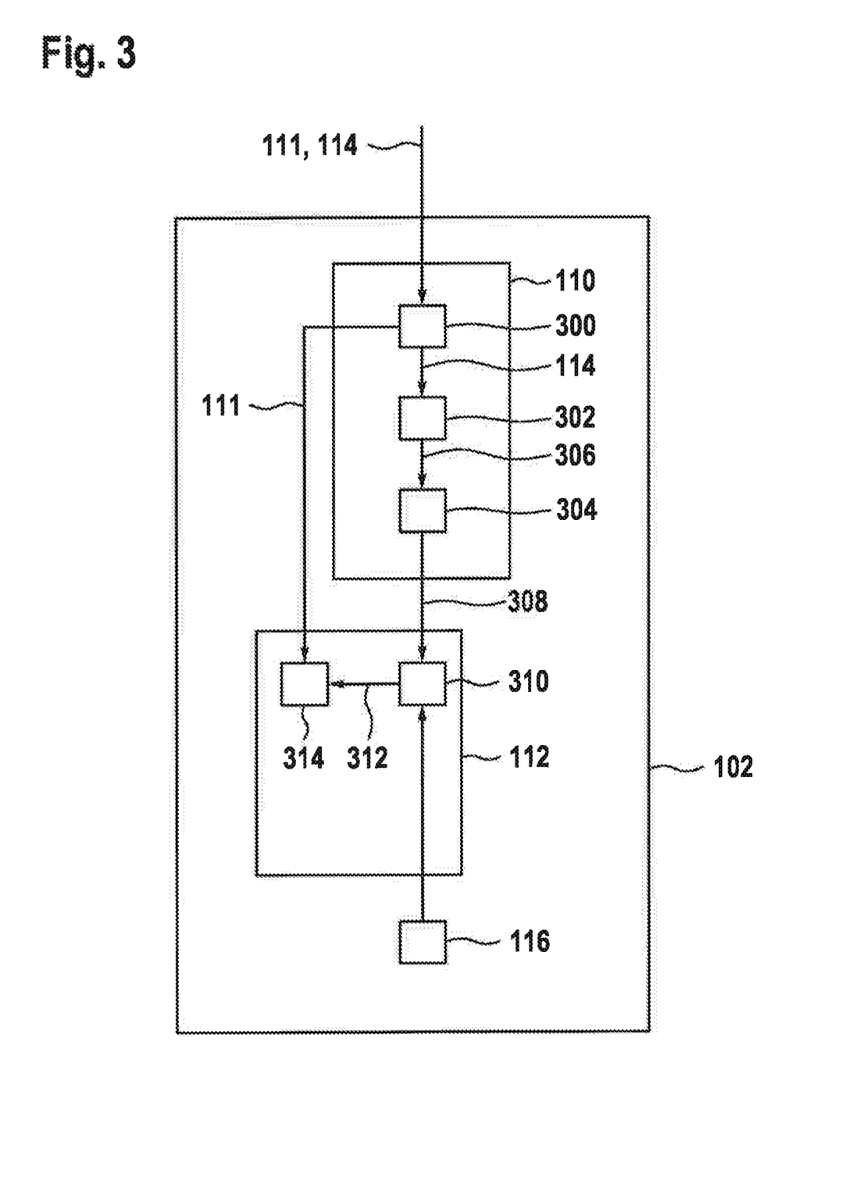
FIG. 3 is a schematic representation of a server system according to an example embodiment of the present invention.

FIG. 3 shows a schematic representation of a server system 102 according to an example embodiment. Server system 102 is, for example, a server system described above in light of FIG. 1. According to this exemplary embodiment, load distribution unit 110 is implemented to include a read-in unit 300, a checking unit 302 and an ascertaining unit 304. Reading-in unit 300 is configured to read in voice command 111, as well as session activation signal 114. Checking unit 302 is configured to receive session activation signal 114 from reading-in unit 300, to check if session activation signal 114 can be assigned to a session ID, using session activation signal 114, and, in the case of an existing association, to transmit a corresponding assignment signal 306 to ascertaining unit 304. Ascertaining unit 304 is configured to ascertain, using assignment signal 306, the availability of the server 112, which, in response to the reading-in of session activation signal 114 by reading-in unit 300, previously processed the session assigned to the session ID. If ascertaining unit 304 has ascertained the availability of server 112, then it sends a corresponding activation signal 308 to an activation unit 310 of server 112. Activation unit 310 is implemented, for example, as a component of a session manager of server 112. Activation unit 310 is configured to continue the session assigned to the session ID on server 112, using activation signal 308, or, if the session is deactivated, to reactivate it by loading corresponding session data from session database 116.

Activation unit 310 is further configured to transmit a received signal 312 to a receiving unit 314 of server 112 subsequent to the activation of the session, or already during the activation of the session, as well. Receiving unit 314 is configured to receive voice command 111 from input unit 300, using received signal 312. Voice command 111 is now processed in the session activated by activation unit 110.

Receiving unit 314 can also be implemented as a component of the session manager of server 112, in the same way as activation unit 310.

Figure 4:
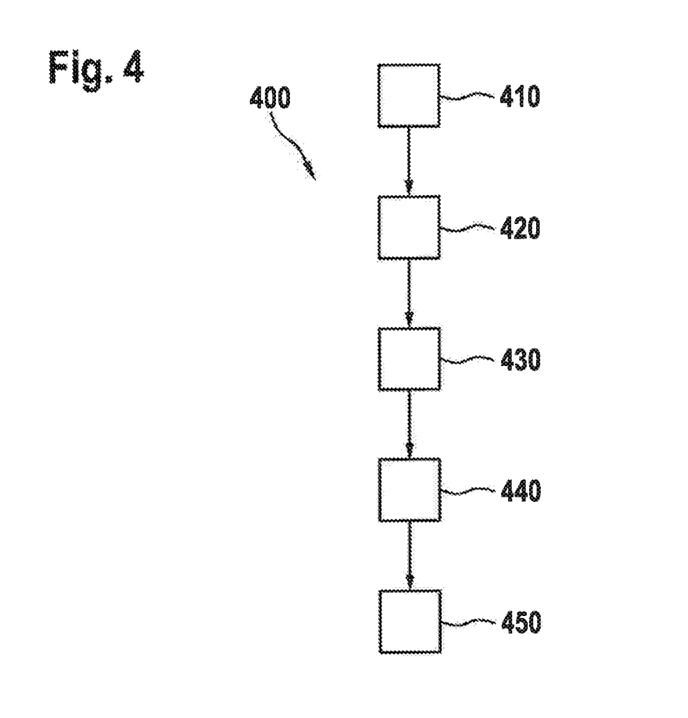
FIG. 4 is a flowchart of a method for operating a server system, according to an example embodiment of the present invention.

FIG. 4 is a flowchart of a method 400 for operating a server system, according to an example embodiment. Method 400 can be executed, for example, in connection with a server system described above, in light of FIGS. 1 through 3. In this case, in a step 410, the session activation signal provided via the interface, in response to the recording of the voice command, is initially read in. In a further step 420, it is checked whether or not the session activation signal has a session ID. If the session activation signal has the session ID, then, in a step 430, it is ascertained whether or not a prior server, which previously processed a session assigned to the session ID upon the reading-in of the session activation signal, is available. If the prior server is available, then, in a step 440, the session is activated on the prior server. However, if the prior server is not available, then, in step 440, the session is activated with the aid of another, free server of the server system, by loading the session from the session database. After the activation of the session, then, in a step 450, the voice command is received for processing in the activated session on the corresponding server. As an alternative, in step 450, the voice command is already received during the activation of the session.

Figure 5:
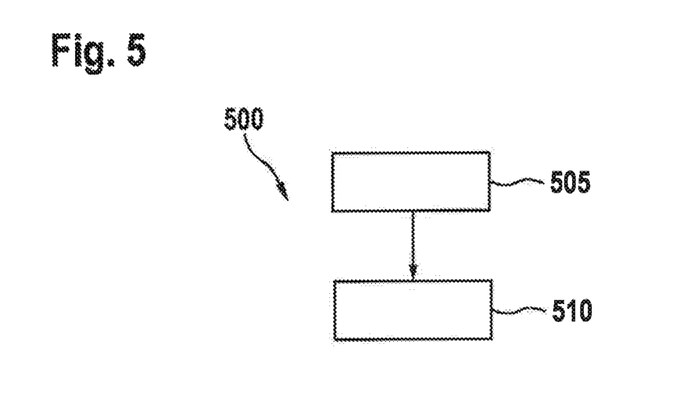
FIG. 5 is a flowchart of a method for operating a recording device, according to an example embodiment of the present invention.

FIG. 5 is a flowchart of a method 500 for operating a recording device, according to an example embodiment. Method 500 can be executed, for example, in connection with a recording device for recording a voice command, described above in light of FIGS. 1 through 3. Method 500 includes a step 510, in which the session activation signal is provided in order to activate a server session for processing the voice command, as soon as, in a step 505, a recording of the voice command by a user of the recording device is started, for instance, by manipulating a corresponding recording button of the recording device, or by saying a keyword to start the recording.

If an exemplary embodiment includes an "and/or" conjunction between a first feature and a second feature, then this is to be understood to mean that according to one specific embodiment, the exemplary embodiment includes both the first feature and the second feature, and according to a further specific embodiment, the exemplary embodiment includes either only the first feature or only the second feature.

What is claimed is:

1. A method for operating a server system that includes a plurality of servers for processing a voice command recorded by a recording device connected via an interface to the server system, the method comprising:
   upon or prior to the recording of the voice command, reading in, by the server system, a session activation signal, which represents a signal provided by the recording device via the interface;
   determining, by the server system, that there is an association between the session activation signal and a session ID;
   responsive to the determination, ascertaining, by the server system, an availability of one of the servers, which previously processed a session assigned to the session ID;
   activating the session, by the server system, in accordance with a result of the ascertainment by executing an algorithm that defines that (a) if the server that previously processed the session is ascertained by the ascertainment to be available, the activation includes activating the server that previously processed the session and (b) if the server that previously processed the session is ascertained by the ascertainment to be unavailable, the activation (1) includes activating a different, available one of the servers and (2) includes the different, available one of the servers loading data assigned to the session from a session database, the data being data concerning the session and previously saved in the session database by the server that previously processed the session;
   receiving, by the server system, the voice command via the interface during or subsequent to the activation of the session; and
   storing in the session database during or at the end of the activated session, by the server activated for the activated session, data concerning the activated session.

2. The method of claim 1, further comprising processing the voice command in the session, using the server activated for the activated session.

3. The method of claim 1, wherein the session is not yet activated when the voice command is received, and the method further comprises temporarily storing the voice command prior to the activation of the session.

4. The method of claim 1, wherein the method is performed by executing an algorithm that defines that where it is established that there is no association between the session activation signal and a session ID, (a) the available server is activated and generates a new session ID, (b) a new session assigned to the new session ID is activated on the available server, and (c) the voice command is received during or subsequent to the activation of the new session.

5. The method of claim 1, wherein the algorithm causes the different, available one of the servers to be ascertained responsive to ascertainment of unavailability of the server that previously processed the session.

6. The method of claim 1, further comprising reading in via the interface a further session activation signal that represents a signal supplied by a further recording device connected to the server system in response to the recording of a further voice command, wherein the determining, ascertaining, activating, and receiving is performed additionally for the further session activation signal.

7. A system comprising:
   a server system that includes:
      a receiving unit for receiving a voice command;
      a plurality of servers for processing the voice command recorded by a recording device connected to the server system via an interface;
      a reading-in unit for reading in, upon or prior to the recording of the voice command, a session activation signal, which represents a signal provided by the recording device via the interface;
      a session database; and
      a processor, wherein the processor is configured to:
         determine whether there is an association between the session activation signal and a session ID;
         in response to a result of the determination being that there is the association between the session activation signal and the session ID, ascertain whether one of the servers, which previously processed a session assigned to the session ID, is available;
         in response to a result of the ascertainment being that the server that previously processed the session is available, activate the session on the server that previously processed the session;
         in response to the result of the ascertainment being that the server that previously processed the session is unavailable, activate the session on a different available one of the servers and the different, available one of the servers loading data assigned to the session from the session database, the data being data concerning the session and previously saved in the session database by the server that previously processed the session;
      wherein the server activated for the activated session is configured to store in the session database during or at the end of the activated session, data concerning the activated session; and
   wherein the voice command is received by the receiving unit during or subsequent to the activation of the session.

8. The system of claim 7, further comprising the recording device and the interface via which the recording device is connected to the server system.

9. A non-transitory computer-readable medium on which are stored instructions that are executable by a processor, and that, when executed by the processor, cause the processor to perform a method for operating a server system that includes a plurality of servers for processing a voice command recorded by a recording device connected via an interface to the server system, the method comprising:
   upon or prior to the recording of the voice command, reading in a session activation signal, which represents a signal provided by the recording device via the interface;

determining that there is an association between the session activation signal and a session ID;

responsive to the determination, ascertaining an availability of one of the servers, which previously processed a session assigned to the session ID;

activating the session in accordance with a result of the ascertainment by executing an algorithm that defines that (a) if the server that previously processed the session is ascertained by the ascertainment to be available, the activation includes activating the server that previously processed the session and (b) if the server that previously processed the session is ascertained by the ascertainment to be unavailable, the activation (1) includes activating a different, available one of the servers and (2) includes the different, available one of the servers loading data assigned to the session from a session database, the data being data concerning the session and previously saved in the session database by the server that previously processed the session;

receiving the voice command via the interface during or subsequent to the activation of the session; and storing in the session database during or at the end of the activated session, by the server activated for the activated session, data concerning the activated session.

* * * * *